(12) United States Patent
You et al.

(10) Patent No.: US 7,554,627 B2
(45) Date of Patent: Jun. 30, 2009

(54) LIQUID CRYSTAL DISPLAY DEVICE

(75) Inventors: Sook-Kyung You, Seoul (KR); Su-Dong Roh, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 361 days.

(21) Appl. No.: 11/645,732

(22) Filed: Dec. 27, 2006

(65) Prior Publication Data
US 2007/0151506 A1    Jul. 5, 2007

(30) Foreign Application Priority Data
Dec. 30, 2005    (KR) .................... 10-2005-0136121

(51) Int. Cl.
*G02F 1/1333* (2006.01)

(52) U.S. Cl. ........................................ 349/72; 349/199

(58) Field of Classification Search ................... 349/72, 349/161, 199
See application file for complete search history.

(56) References Cited

U.S. PATENT DOCUMENTS

2005/0083443 A1* 4/2005 Lee et al. ..................... 349/21

* cited by examiner

*Primary Examiner*—Jerry T Rahll
(74) *Attorney, Agent, or Firm*—Holland & Knight LLP

(57) ABSTRACT

A liquid crystal display device includes an image display unit including a plurality of pixels having a first liquid crystal material, a temperature detecting unit for detecting an environmental temperature using a second liquid crystal material, and a temperature control unit for controlling a temperature of the layer of the first liquid crystal material based on temperature information from the temperature detecting unit.

20 Claims, 3 Drawing Sheets

LIQUID CRYSTAL DISPLAY DEVICE

This application claims the benefit of Korean Application No. 10-2005-0136121, filed in Korea on Dec. 30, 2005, which is hereby incorporated by reference in its entirety.

BACKGROUND OF THE INVENTION

1. Field of the Invention

Embodiments of the invention relate to a display device, and more particularly, to a liquid crystal display device. Although embodiments of the invention are suitable for a wide scope of applications, it is particularly suitable for operating a liquid crystal display device in an extremely low temperature environment or an extremely high temperature environment, which are outside an operating temperature range of liquid crystal material.

2. Description of the Background Art

In general, a liquid crystal display device displays a desired image by individually supplying data signals based on image information to liquid crystal cells arranged in a matrix shape so as to control light transmittance through the liquid crystal cells. More particularly, the liquid crystal display devices have a liquid crystal panel with pixel units that are liquid crystal cells arranged in a matrix shape. The pixel units are driven by a driving circuit on the liquid crystal panel.

The liquid crystal display panel includes a color filter substrate, a thin film array substrate, and a layer of liquid crystal molecules positioned between the color filter substrate and the thin film array substrate. The color filter substrate and the thin film transistor array substrate are attached to each other by a seal pattern adjacent to the edge of the liquid crystal panel. Color filters and a black matrix for preventing light leakage between pixels are formed on the color filter substrate. Gate lines and data lines that cross each other to define the pixel units are formed on the thin film transistor. Switching elements that switch the pixel units are respectively formed adjacent to where the gate lines and the data lines cross each other.

Gate pads and data pads are formed at ends of the gate lines and the data lines, respectively, for electrical connection to the driving circuit. The driving circuit includes a gate driving unit that supplies a scanning signal to each of the gate pads of the liquid crystal panel, and a data driving unit that supplies image information to the data pads. The gate driving unit and the data driving unit are integrated as a plurality of integrated circuits (hereinafter, referred to as "IC").

The liquid crystal display device that includes the above-described structure drives a layer of liquid crystal molecules with a signal applied to each pixel electrode so as to display an image. In general, the liquid crystal molecules can be driven within an operating temperature range of about −20° C. to about 60° C. When the liquid crystal panel is used in an environment in which the temperature is outside of the operating temperature range of the liquid crystal material, either a poor image or no image is displayed.

For example, a liquid crystal panel can be used as an aircraft display that displays important flight information to a pilot. The liquid crystal panel may not properly display the flight information when the environment temperature goes below −20° C. or above 60° C. More particularly, the liquid crystal material in the liquid crystal panel can not be properly driven in a low temperature environment of below −20° C. or in a high temperature environment of above 60° C. Because the liquid crystal panel can not be properly driven at such low temperatures or at such high temperatures, flight information on the aircraft display screen may not be discernable.

The environmental temperature in which a liquid crystal display can operate is limited according to the related art. Information within a displayed image can not be reliably provided on the liquid crystal panel when the temperature of the environment outside of the liquid crystal panel is not within the operating temperature range of the liquid crystal material in the liquid crystal panel. Thus, the related art liquid crystal display are limited to temperature environments within the operating temperature range of the liquid crystal material.

SUMMARY OF THE INVENTION

Accordingly, embodiments of the invention is directed to a liquid crystal display device that substantially obviates one or more of the problems due to limitations and disadvantages of the related art An object of embodiments of the invention is to provide a liquid crystal display device capable of operating in environmental temperatures outside of the of operating temperature range of the liquid crystal material in the liquid crystal panel.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of the invention, as embodied and broadly described herein, there is provided liquid crystal display device including an image display unit including a plurality of pixels having a first liquid crystal material, a temperature detecting unit for detecting an environmental temperature using a second liquid crystal material, and a temperature control unit for controlling a temperature of the layer of the first liquid crystal material based on temperature information from the temperature detecting unit.

In another aspect, a liquid crystal display device includes an image display unit including a plurality of pixels having a first layer of first liquid crystal material, a temperature detecting unit for detecting environmental temperature, first and second electrodes attached to the temperature detecting unit, wherein the first and second electrodes are formed on a surfaces of first and second substrates the face each other, a second liquid crystal material positioned between the first and second electrodes, and a temperature control unit for controlling a temperature of the layer of the first liquid crystal material based on temperature information from the temperature detecting unit.

In another aspect, a liquid crystal display device includes an image display unit including a plurality of pixels having a first liquid crystal material, a first dielectric constant measuring portion measuring a dielectric constant in a minor axis of a second liquid crystal material, a second dielectric constant measuring portion measuring a dielectric constant in a major axis of a third liquid crystal material, and a temperature control unit for controlling the temperature of the layer of the first liquid crystal material based on measurements from the first and second dielectric constant measuring portions.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention. In the drawings.

DETAILED DESCRIPTION OF THE PREFERRED EMBODIMENTS

Figure 1:
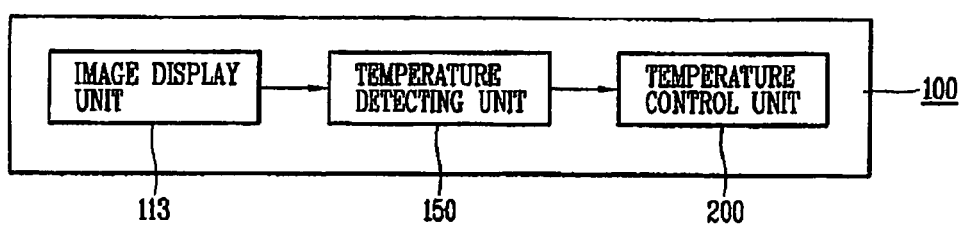
FIG. 1 is a schematic view illustrating a liquid crystal display device according to an embodiment of the invention.

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions are exaggerated for clarity. Like reference numerals in the drawings denote like elements.

FIG. 1 is a schematic view illustrating a liquid crystal display device according to an embodiment of the invention. As shown in FIG. 1, a liquid crystal display panel device 100 according to an embodiment of the invention includes an image display unit 113 having a plurality of pixels, a temperature detecting unit 150 provided on the image display unit for detecting environmental temperature, and a temperature control unit 200 controlling the temperature of the liquid crystal layer on the basis of temperature information from the temperature detecting unit.

Figure 2:
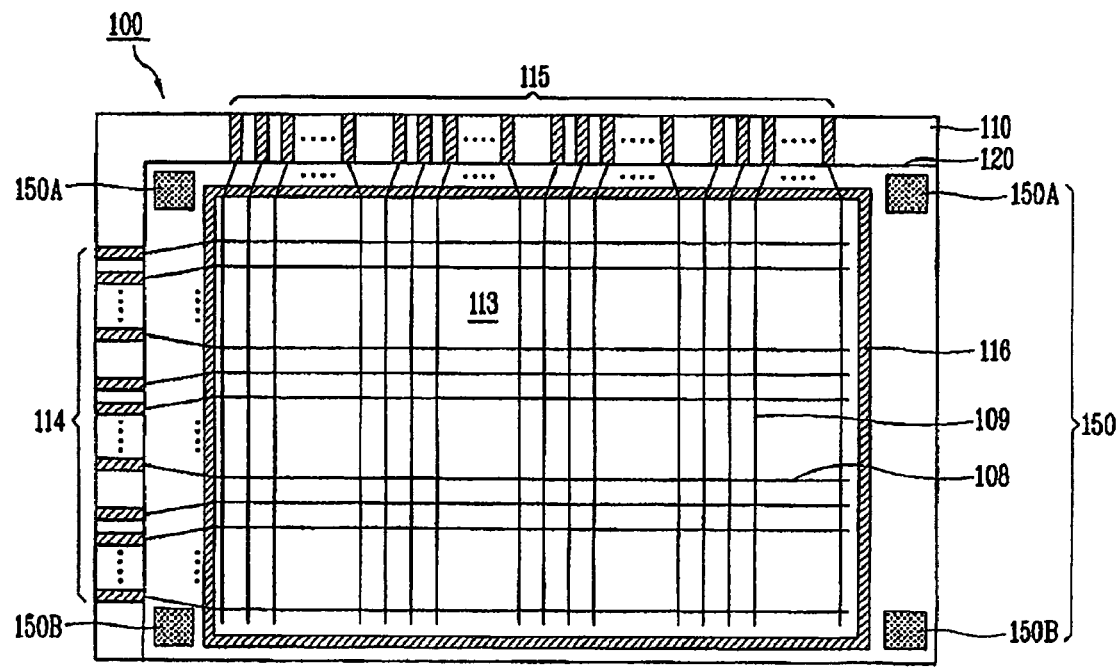
FIG. 2 is a schematic plan view illustrating a liquid crystal display device according to an embodiment of the invention.

FIG. 2 is a schematic plan view illustrating a liquid crystal display device according to an embodiment of the invention. As shown in FIG. 2, the liquid crystal display device 100 according to the embodiment of the invention includes a thin film transistor array substrate 110, a color filter substrate 120, and layers of liquid crystal material (not shown) interposed therebetween. The thin film transistor array substrate 110 includes the image display unit 113 having liquid crystal cells, gate pads 114, and data pads 115. The liquid crystal cells are defined by a plurality of gate lines 108 arranged in a first direction and a plurality of data lines 109 arranged in a second direction perpendicular to the first direction. Further, the liquid crystal cells are arranged in a matrix shape. The gate pads 114 are connected to the gate lines 108 of the image display unit 113 for providing external signals to the gate lines. The data pads 115 are connected to the data lines 109.

The gate pads 114 and the data pads 115 are formed at edge regions of the thin film transistor array substrate 110 that are not overlapped by the color filter substrate 120 after the substrates are cut into unit panels. The gate pads 114 supply gate signals, which are supplied from a gate driving circuit (not shown), to the gate lines 108 of the image display unit 113. The data pads 115 supply data signals, which are supplied from a data driving circuit (not shown), to the data lines 109 of the image display unit 113. The gate driving circuit may be separately formed outside of or on the transistor array substrate 110.

Although not shown in the drawings, a thin film transistor that serves as a switching element for switching each of the liquid cells is formed at each intersection between the gate lines 108 and the data lines 109. The thin film transistor includes gate electrodes, a semiconductor layer, and source/drain electrodes. The gate electrodes and the semiconductor layer are insulated from each other by a gate insulating layer (not shown) interposed therebetween. The gate insulating layer (not shown) is formed over the entire surface of the thin film transistor array substrate 110, and a passivation layer (not shown) for protecting the thin film transistor is also formed over the entire surface of the substrate. Therefore, the gate insulating layer and the passivation film are also laminated on the thin film transistor array substrate 110 that corresponds to an outer part of the image display unit 113.

A heating line (not shown) is formed along the gate lines 108 and data lines 109. The heating line increases the temperature of liquid crystal material when the environmental temperature is below a range of operating temperatures for the liquid crystal material, such that a liquid crystal panel can be driven in a normal state. That is, since the range (i.e., $-20°$ C. to $60°$ C.) of the operating temperature of the liquid crystal material is limited, it may be impossible for the liquid crystal panel to be driven in the normal state in an environment when the temperature is below the range of operating temperatures for the liquid crystal material. Therefore, the heating line is formed as a liquid crystal heater capable of increasing the temperature of the liquid crystal material. The heating line generates heat when a current is applied therethrough. The heating line can be formed of a metallic material, such as aluminum (Al). Accordingly, the heating line allows driving of the liquid crystal molecules regardless of low ambient environmental temperatures.

A black matrix (not shown) is formed on the color filter substrate 120 so as to prevent light leakage occurring among color filters (not shown) of respective cell regions, and the switching elements, the gate lines 108, the data lines 109, the image display unit 113, and the pads 114 and 115 of the thin film transistor array substrate 110. Further, an overcoat layer (not shown) may be formed over the entire surface of the substrate, including the black matrix and the color filters. A sealant 116 is formed on an upper substrate (color filter substrate 120) that corresponds to an edge of the thin film transistor array substrate 110 such that the upper substrate can be attached to the thin film transistor array substrate 110.

Any one of TN (twisted nematic) or IPS (in plane switching) modes may be applied to the liquid crystal display device. In the case of the TN mode liquid crystal display device, pixel electrodes are formed on the thin film transistor array substrate 110 and a common electrode is formed on the upper substrate. In the case of the IPS mode liquid crystal display device, both a common electrode and pixel electrodes that generate a horizontal electric field are formed on the thin film transistor array substrate 110. The temperature detecting unit 150 that detects the environmental temperature for the liquid crystal panel is formed on a dummy region outside of the image display unit 113.

The temperature detecting unit 150 includes a first dielectric constant measuring portions 150A and a second dielectric constant measuring portions 150B. Each of the first and second dielectric constant measuring portions 150A and 150B includes the first and second substrates 110 and 120 and a layer of liquid crystal material interposed therebetween. The first and second dielectric constant measuring portions 150A and 150B measure a dielectric constant in a major axis and a dielectric constant in a minor axis of the liquid crystal molecules in the dielectric constant measuring portions according to alignment of the liquid crystal molecules such that the temperature is detected on the basis of a difference between the dielectric constants.

Figure 3A:
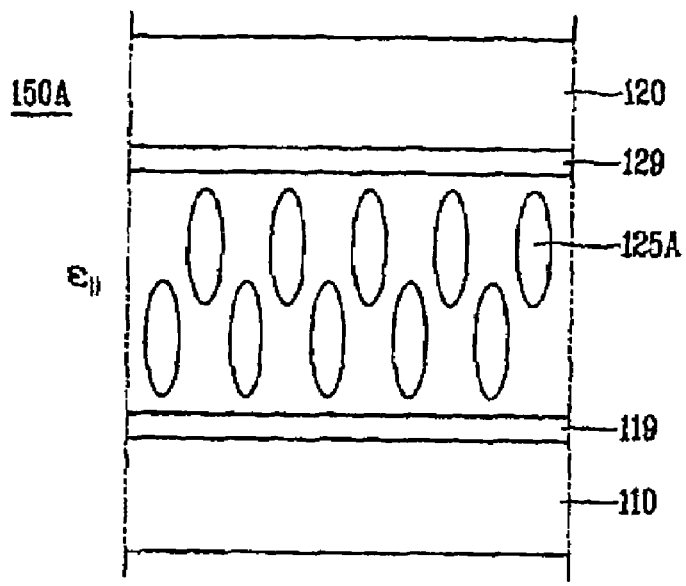
FIGS. 3A and 3B are cross-sectional views respectively illustrating first and second dielectric constant measuring portions.
Figure 3B:
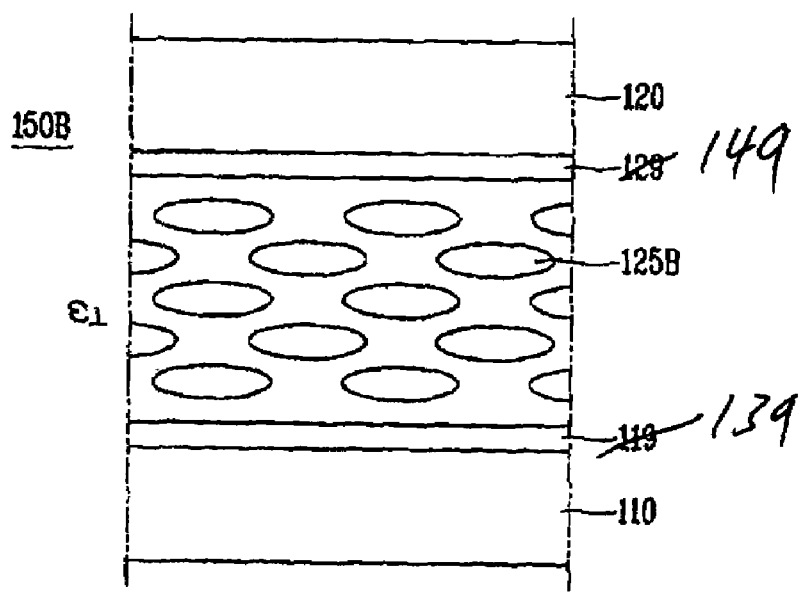

FIGS. 3A and 3B are cross-sectional views respectively illustrating first and second dielectric constant measuring portions. As shown in FIG. 3A, the first dielectric constant measuring portion 150A includes the first substrate 110 and the second substrate 120 that face each other, a first electrode 119 and a second electrode 129 respectively formed on the facing surfaces of the first and second substrates 110 and 120, and a first layer of liquid crystal material 125A that is aligned in a perpendicular manner between the first electrode 119 and the second electrode 129. As shown in FIG. 3B, the second dielectric constant measuring portion 150B includes the first substrate 110 and the second substrate 120 that face each other, the third electrode 139 and the fourth electrode 149 that are formed on a surface where the first and second substrates 110 and 120 face each other, and a second layer of liquid crystal material 125B that is aligned in a horizontal manner between the third electrode 139 and the fourth electrode 149. The first and second substrates 110 and 120 can be the same substrates used to form the image display unit 113.

The first dielectric constant measuring portion 150A is formed in such a way that the liquid crystal layer 125A is aligned in a direction parallel to an electric field direction when a voltage is applied to the first and second electrodes 119 and 129. The second dielectric constant measuring portion 150B is formed in such a way that the liquid crystal layer 125B is aligned in a direction perpendicular to the electric field direction between the third and fourth electrodes 139 and 149, that is, in a direction parallel to the first substrate 110 even when the voltage is applied to the third and fourth electrodes 139 and 149. The first and second dielectric constant measuring portions 150A and 150B measure dielectric constants ($\in_|$ and $\in^\perp$) in the major axis and in the minor axis, respectively, of the liquid crystal molecules.

The dielectric constant ($\in$) may be obtained according to Equation 1.

$$\varepsilon = \frac{-t}{\ln V} E\left(\frac{d}{REA}\right) \quad \text{[Equation 1]}$$

V indicates a voltage measured from a dielectric constant measuring portion 150A or 150B, R indicates wiring resistance, A indicates an area of the first or second dielectric constant measuring portion, and d indicates a cell gap in the dielectric measuring portion. Further, t indicates time, and is determined by the value V.

Since the dielectric constant of the liquid crystal molecules is obtained according to the above-described equation changes according to the temperature, the temperature can be detected on the basis of the dielectric constants measured by the first and second dielectric constant measuring portions 150A and 150B. Thus, environmental temperature can be determined by individually measuring the dielectric constants and analyzing the differences between the dielectric constants.

To detect the temperature of the image display unit with accuracy, the first dielectric constant measuring portions 150A may be formed in one corner of the image display unit 113, and the second dielectric constant measuring portions 150B may be formed in an opposite corner of the image display unit 113. Alternatively, the first dielectric constant measuring portion 150A and the second dielectric constant measuring portion 150B may be formed adjacent to each other at corners of the image display unit 113. Alternatively, either the first dielectric constant measuring portion 150A or the second dielectric constant measuring portion 150B may only be formed because temperature can be detected on the basis of one of the dielectric constants in either the major axis or the minor axis.

Figure 4:
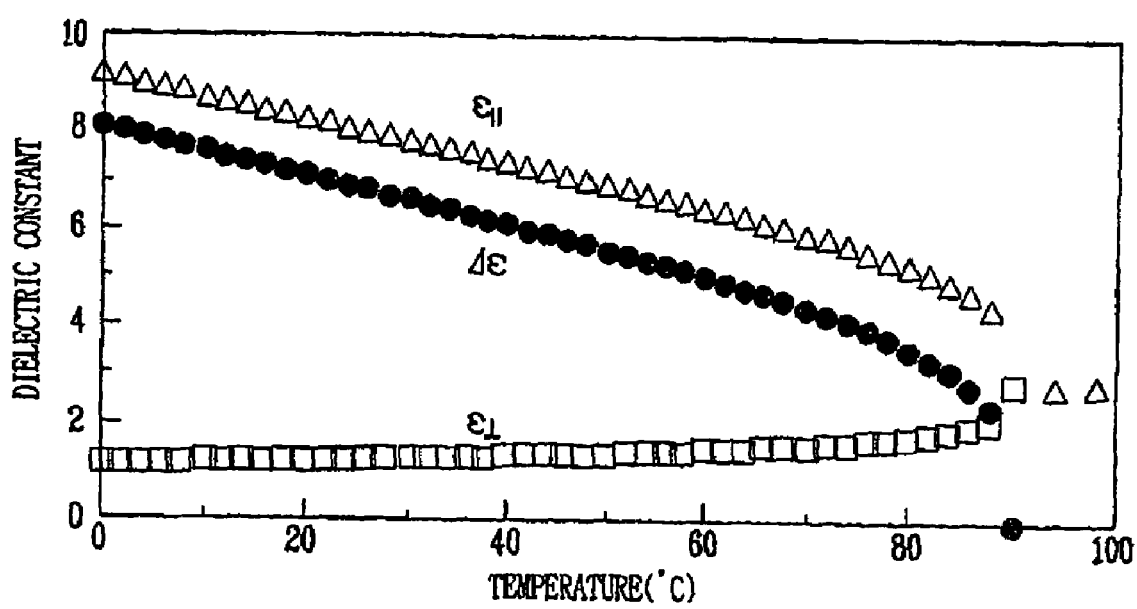
FIG. 4 is a graph illustrating a change in dielectric constant of a liquid crystal material in accordance with temperature.

FIG. 4 is a graph illustrating a change in dielectric constant of a liquid crystal material in accordance with temperature. As shown in the graph of FIG. 4, it can be seen that as the temperature increases, the dielectric constant ($\in$ %) in the minor axis of the liquid crystal molecules increases, and the dielectric constant ($\in_|$) in the major axis decreases. The degree to which the dielectric constant ($\in_|$) in the major axis decreases as the temperature increases is larger than a degree to which the dielectric constant ($\in$ %) in the minor axis of the liquid crystal molecules increases. Therefore, the difference ($\Delta\in$) between the dielectric constants gradually decreases as the temperature increases. However, embodiments of the invention are not limited to a specific type of liquid crystal molecules. The characteristics of dielectric constants for other liquid crystal materials according to the temperature may be different from the liquid crystal material shown in the graph of FIG. 4.

The embodiments of the invention detect a change in dielectric constants of liquid crystal molecules due to temperature so as to detect the temperature and control the temperature of the liquid crystal panel based on the detected temperature. The detected temperature detected by the temperature detecting unit 150 is used to heat or cool the image display unit 113 of a liquid crystal display device 100 according to an embodiment of the invention. That is, a current is applied to the heating line formed on the first substrate 110 in an extremely low temperature environment below the operating temperature range of the liquid crystal material such that the temperature of the liquid crystal material is heated and maintained within the operating temperature range of the liquid crystal material, and a fan that is separately provided from the liquid crystal panel is driven when the temperature of the liquid crystal is extremely high, such that the temperature of the liquid crystal layer decreases.

The basic concept of the invention is that the dielectric constant measuring portions that are capable of measuring dielectric constants of liquid crystal are provided either on or outside the image display unit such that an environmental temperature is measured on the basis of the dielectric constants. The temperature control unit may be applied in various ways by using the known technologies in addition to the heating line or the fan. As described above, according to embodiment of the invention, the liquid crystal display device can be driven regardless of the environmental temperature provided that the temperature detecting unit is provided so as to detect the environmental temperature, and the temperature of the liquid crystal material is controlled by the temperature control unit on the basis of the detected environmental temperature.

It will be apparent to those skilled in the art that various modifications and variations can be made in the liquid crystal display device of embodiments of the invention without departing from the spirit or scope of the invention. Thus, it is intended that embodiments of the invention cover the modifications and variations of this invention provided they come within the scope of the appended claims and their equivalents.

What is claimed is:

1. A liquid crystal display device comprising:
    an image display unit including a plurality of pixels having a first liquid crystal material;
    a temperature detecting unit for detecting an environmental temperature using a second liquid crystal material; and
    a temperature control unit for controlling a temperature of the layer of the first liquid crystal material based on temperature information from the temperature detecting unit.

2. The liquid crystal display device of claim 1, wherein the temperature detecting unit includes a first dielectric constant measuring portion measuring a dielectric constant in a minor axis of the second liquid crystal material.

3. The liquid crystal display device of claim 2, wherein the first dielectric constant measuring portion includes:
    first and second electrodes attached to the temperature detecting unit; and
    a second liquid crystal material positioned between the first and second electrodes.

4. The liquid crystal display device of claim 2, wherein the first dielectric constant measuring portion is positioned in a corner of the image display unit.

5. The liquid crystal display device of claim 2, wherein the first dielectric constant measuring portion is positioned on a dummy substrate outside of the image display unit.

6. The liquid crystal display device of claim 1, wherein the temperature detecting unit includes a first dielectric constant measuring portion measuring a dielectric constant in a major axis of the second liquid crystal material.

7. The liquid crystal display device of claim 6, wherein the first dielectric constant measuring portion includes:
    first and second electrodes attached to the temperature detecting unit; and
    second liquid crystal material positioned between the first and second electrodes.

8. The liquid crystal display device of claim 6, wherein the first dielectric constant measuring portion is positioned at a corners of the image display unit.

9. The liquid crystal display device of claim 6, wherein the first dielectric constant measuring portion is positioned on a dummy substrate outside of the image display unit.

10. The liquid crystal display device of claim 1, wherein the temperature detecting unit includes:
    a first dielectric constant measuring portion measuring a dielectric constant in a minor axis of the second liquid crystal material; and
    a second dielectric constant measuring portion measuring a dielectric constant in a major axis of a third liquid crystal material.

11. The liquid crystal display device of claim 10, wherein the first dielectric constant measuring portion includes:
    first and second electrodes attached to the temperature detecting unit; and
    a second liquid crystal material positioned between the first and second electrodes.

12. The liquid crystal display device of claim 11, wherein the second dielectric constant measuring portion includes:
    third and fourth electrodes attached to the temperature detecting unit; and
    a third liquid crystal material positioned between the third and fourth electrodes.

13. The liquid crystal display device of claim 10, wherein the first and second dielectric constant measuring portions are positioned at opposite corners of the image display unit.

14. The liquid crystal display device of claim 10, wherein the first and second dielectric constant measuring portions are positioned on a dummy substrate outside of the image display unit.

15. A liquid crystal display device comprising:
    an image display unit including a plurality of pixels having a first layer of first liquid crystal material;
    a temperature detecting unit for detecting an environmental temperature;
    first and second electrodes attached to the temperature detecting unit, wherein the first and second electrodes are formed on a surfaces of first and second substrates the face each other;
    a second liquid crystal material positioned between the first and second electrodes; and
    a temperature control unit for controlling the temperature of the layer of the first liquid crystal material based on temperature information from the temperature detecting unit.

16. A liquid crystal display device comprising:
    an image display unit including a plurality of pixels having a first liquid crystal material;
    a first dielectric constant measuring portion measuring a dielectric constant in a minor axis of a second liquid crystal material;
    a second dielectric constant measuring portion measuring a dielectric constant in a major axis of a third liquid crystal material; and
    a temperature control unit for controlling the temperature of the layer of the first liquid crystal material based on measurements from the first and second dielectric constant measuring portions.

17. The liquid crystal display device of claim 16, wherein the first dielectric constant measuring portion includes:
    first and second substrates; and
    first and second electrodes at facing surfaces of the first and second substrates, wherein the second liquid crystal material is positioned between the first and second electrodes.

18. The liquid crystal display device of claim 17, wherein the second dielectric constant measuring portion includes third and fourth electrodes at the facing surfaces of the first and second substrates, wherein the third liquid crystal material is positioned between the third and fourth electrodes.

19. The liquid crystal display device of claim 16, wherein the first and second dielectric constant measuring portions are positioned at opposite corners of the image display unit.

20. The liquid crystal display device of claim 16, wherein the first and second dielectric constant measuring portions are positioned on a dummy substrate outside of the image display unit.

* * * * *